US011974699B2

(12) United States Patent
Ney et al.

(10) Patent No.: US 11,974,699 B2
(45) Date of Patent: May 7, 2024

(54) DRIVE COUPLING FOR A FOOD PROCESSING DEVICE

(71) Applicant: CONAIR LLC, Stamford, CT (US)

(72) Inventors: Francis M. Ney, Watertown, CT (US); David Edward Kayser, Thomaston, CT (US)

(73) Assignee: CONAIR LLC, Stamford, CT (US)

( * ) Notice: Subject to any disclaimer, the term of this patent is extended or adjusted under 35 U.S.C. 154(b) by 400 days.

(21) Appl. No.: 17/221,915

(22) Filed: Apr. 5, 2021

(65) Prior Publication Data

US 2022/0313021 A1    Oct. 6, 2022

(51) Int. Cl.
*A47J 43/00* (2006.01)
*A47J 43/08* (2006.01)
*F16D 1/108* (2006.01)

(52) U.S. Cl.
CPC ............ *A47J 43/085* (2013.01); *F16D 1/108* (2013.01)

(58) Field of Classification Search
CPC .............................. A47J 43/085; F16D 1/108
See application file for complete search history.

(56) References Cited

U.S. PATENT DOCUMENTS

| | | |
|---|---|---|
| 2,716,564 A | 8/1955 | Lofqvist |
| 3,388,934 A | 6/1968 | Chapman, Jr. et al. |
| 5,365,807 A | 11/1994 | Darrah et al. |
| 7,566,186 B2 | 7/2009 | Katz et al. |
| 8,042,990 B2 | 10/2011 | Pryor, Jr. et al. |
| 9,500,235 B2 | 11/2016 | Kanning |
| 2003/0066917 A1 | 4/2003 | Brezovnik et al. |
| 2006/0275075 A1 | 12/2006 | Katz et al. |
| 2014/0270929 A1 | 9/2014 | Kanning |
| 2015/0023130 A1 | 1/2015 | Foxlee et al. |
| 2015/0201809 A1 | 7/2015 | Balasubramanian |
| 2018/0042427 A1* | 2/2018 | Boozer ................. A47J 43/085 |

FOREIGN PATENT DOCUMENTS

| | | |
|---|---|---|
| GB | 281078 | 12/1927 |
| GB | 2560489 A | 9/2018 |
| WO | 2220981 | 8/2010 |

OTHER PUBLICATIONS

PCT International Search Report dated Jul. 14, 2022 from corresponding International Application No. PCT/US22/22450 filed Mar. 30, 2022.

* cited by examiner

*Primary Examiner* — Anshu Bhatia
(74) *Attorney, Agent, or Firm* — Grogan, Tuccillo & Vanderleeden LLP

(57) ABSTRACT

A drive coupling assembly for a food processing device includes an adapter having a connection mechanism for connection of the adapter to a drive shaft of a motor of a food processing device, and a coupler body having an aperture and an opening, the opening being configured to receive a shaft of a blade of a food processing container, and the aperture being configured to releasably receive the adapter.

20 Claims, 5 Drawing Sheets

DRIVE COUPLING FOR A FOOD PROCESSING DEVICE

FIELD OF THE INVENTION

The present invention relates generally to food processing devices and, more particularly, to a drive coupling for a food processing device.

BACKGROUND OF THE INVENTION

Food processing devices providing a number of different types of food processing operations such as blending, mixing, grinding, chopping, slicing, grating, shredding, and the like, are well known. Existing food processing devices typically include a base housing an electric motor, a drive shaft driven by the motor, a blending or processing jar receivable on the base and a lid or cover releasably mounted to the jar. A rotatably driven blade is mounted in the bottom of the jar and is engageable with the drive shaft so as to be driven by the motor to process one or more food items inside the jar.

To this end, a drive coupling is typically used to couple the shaft of the motor to the shaft carrying the blade. A typical prior art drive coupling is threaded onto the motor shaft in a fashion such that when the motor rotates, the coupler will become tighter on the shaft rather than loosen from the shaft. After some usage, however, these drive couplings wear out and need to be replaced. This is not an easy task, however, because when one engages and turns the coupling, the entire motor shaft rotates, thereby not loosening the coupling from the drive shaft. To loosen the coupling, the machine must be disassembled to gain access to the armature of the motor so that it can be held while the coupling is removed from the drive shaft and replaced. Then, of course, the machine must be re-assembled.

In view of the above, there is a need for a drive coupling for a blender or other food processing device that can be easily and quickly replaced.

SUMMARY OF THE INVENTION

It is an object of the present invention to provide a food processing device.

It is another object of the present invention to provide a food processing device having a drive coupling that can be easily and quickly replaced.

It is another object of the present invention to provide a drive coupling for a food processing device.

It is another object of the present invention to provide a method for replacing the drive coupling of a food processing device.

These and other objects are achieved by the present invention.

According to an embodiment of the present invention, a drive coupling assembly for a food processing device is provided. The drive coupling assembly includes for a food processing device includes an adapter having a connection mechanism for connection of the adapter to a drive shaft of a motor of a food processing device, and a coupler body having an aperture and an opening, the opening being configured to receive a shaft of a blade of a food processing container, and the aperture being configured to releasably receive the adapter.

According to another embodiment of the present invention, a food processing device is provided. The food processing device includes a motor, a drive shaft driven by the motor, an adapter connected to a distal end of the drive shaft, a coupler bod removably connected to the adapter, the coupler body having an upwardly-facing opening configured to receive a shaft of a blade of a food processing container of the food processing device, and a retaining mechanism configured to retain the coupler body on the adapter.

According to yet another embodiment of the present invention, an adapter for a food processing device is provided. The adapter includes a rectangular body, a threaded bore configured to threadedly receive a drive shaft of a motor of a food processing device for connection of the adapter to the drive shaft, and one of a spring-biased ball plunger or a recess configured for engagement with the other of a spring-biased ball plunger or a recess associated with a coupler body of the food processing device, the coupler body being configured to transmit rotational movement of the drive shaft of the motor to a shaft of a blade of a food processing container of the food processing device.

DETAILED DESCRIPTION OF THE PREFERRED EMBODIMENTS

Figure 1:
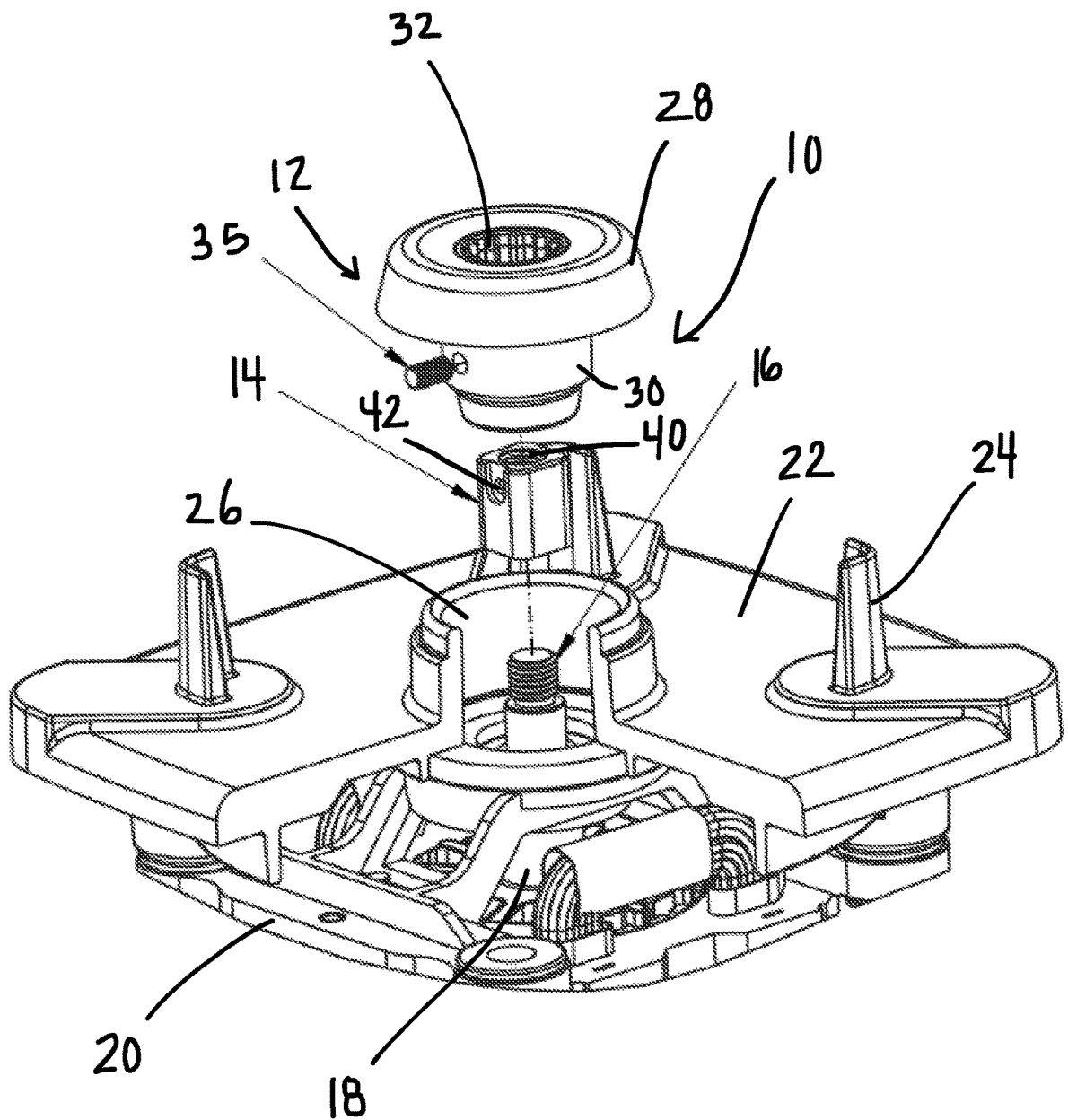
FIG. 1 is an exploded, perspective view of a drive coupling for a food processing device, shown in relation to a drive shaft of the food processing device.
Figure 2:
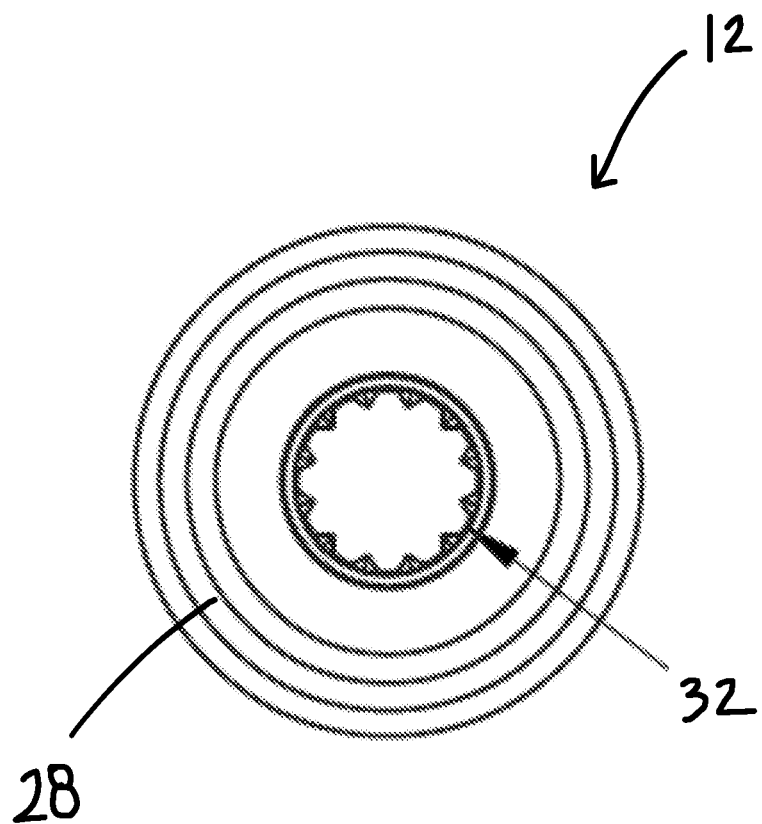
FIG. 2 is a top plan view of the drive coupling of FIG. 1.
Figure 3:
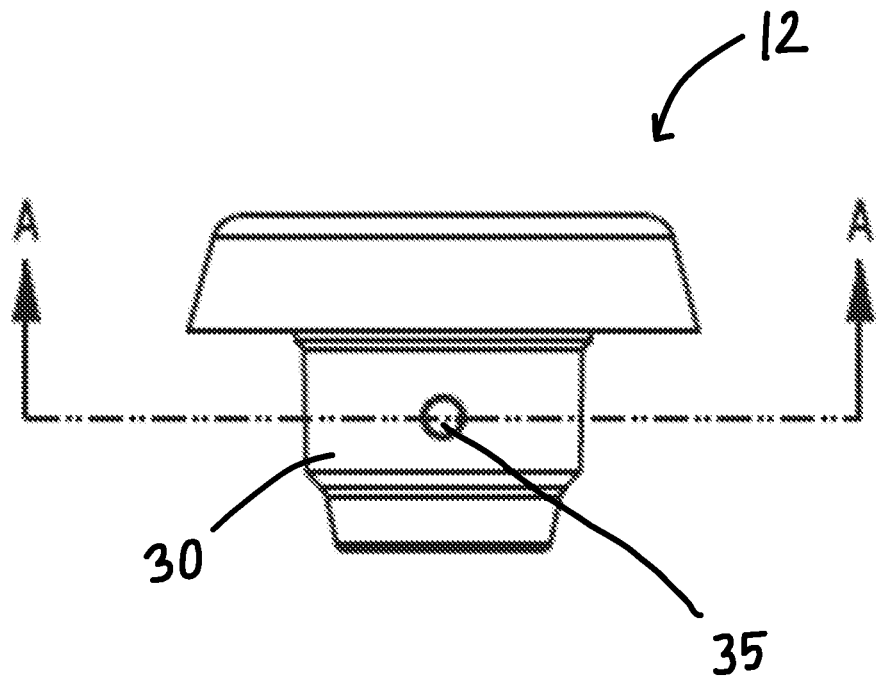
FIG. 3 is a side elevational view of the drive coupling of FIG. 1.
Figure 4:
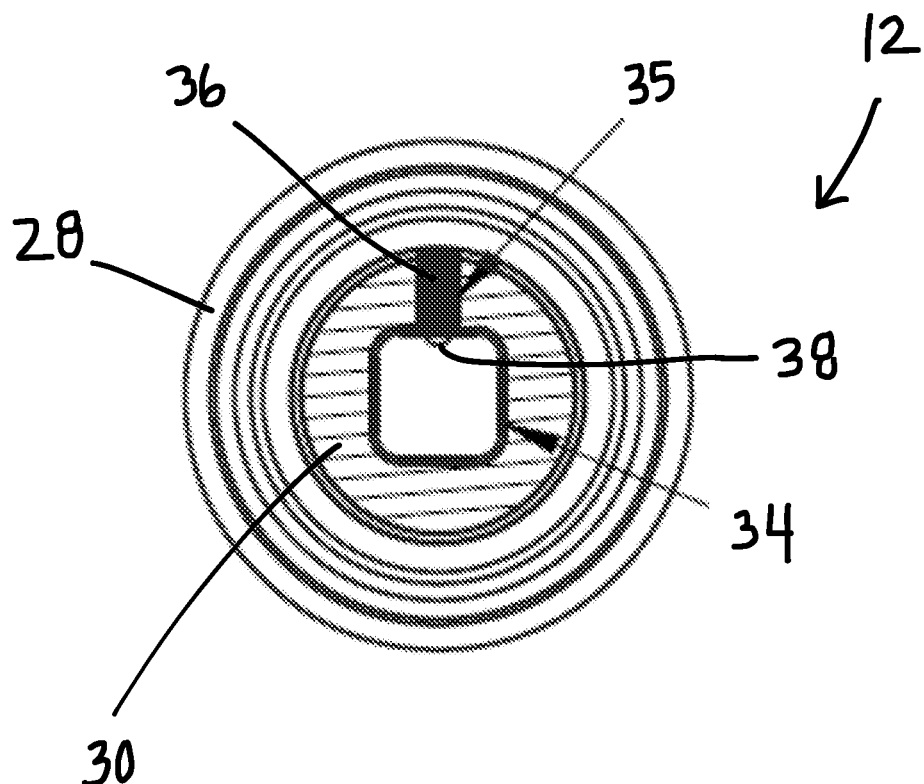
FIG. 4 is a cross-sectional view of the drive coupling, taken along line A-A of FIG. 3.

With reference to FIG. 1, a drive coupling assembly 10 for a food processing device, such as a blender, is illustrated. The drive coupling assembly 10 includes a coupler body 12 and an adapter 14 receivable within the coupler body 12, as discussed hereinafter. The drive coupling assembly 10 is configured for attachment to the threaded shaft 16 of a motor 18, which is maintained within a motor housing 20. Motor housing 20 is shown in the form of a base for a blender and as such it includes, inter alia, feet (not shown), a control panel (not shown), a pad 22 for receiving thereon a food processing container (not shown), container locator feet 24, and an aperture 26 in the pad 22 through which the motor drive shaft 16 extends. When drive coupling assembly 10 is attached to shaft 16 in a manner hereinafter described, a conventional blender pitcher or food processing container may be placed on pad 22, being properly located by feet 24. While the drive coupling assembly 10 of the present invention is described with respect to its usefulness in the environment of a blender or food processing device, it will be evident that the drive coupling assembly 10 could find use in other environments where two shafts are to be coupled.

With reference to FIGS. 1-4, the coupler body 12 of the drive coupling assembly 10 may be generally mushroom shaped, having a cap 28 and a stem 30. Cap 28 is provided with a splined central opening 32 which receives a splined shaft (not shown) of a blade carried on a conventional blender or processing container. Thus, when the processing container is placed on pad 22, as previously described, the blade shaft, which depends downwardly from the bottom of the processing container, will be received in opening 32 of cap 28.

Figure 5:
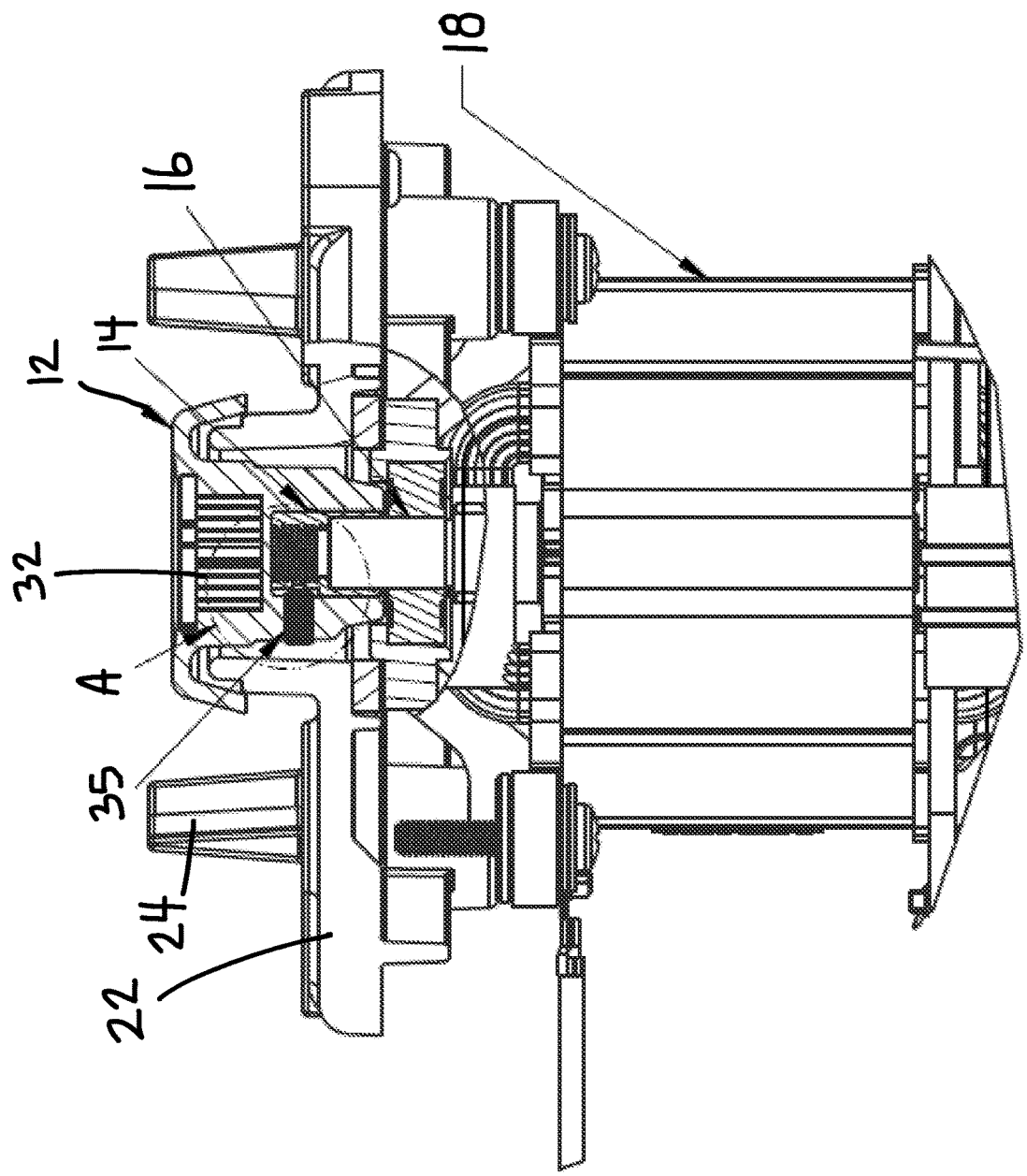
FIG. 5 is a cross-sectional view of a blender base, illustrating connection of the drive coupling with the drive shaft of the food processing device.
Figure 6:
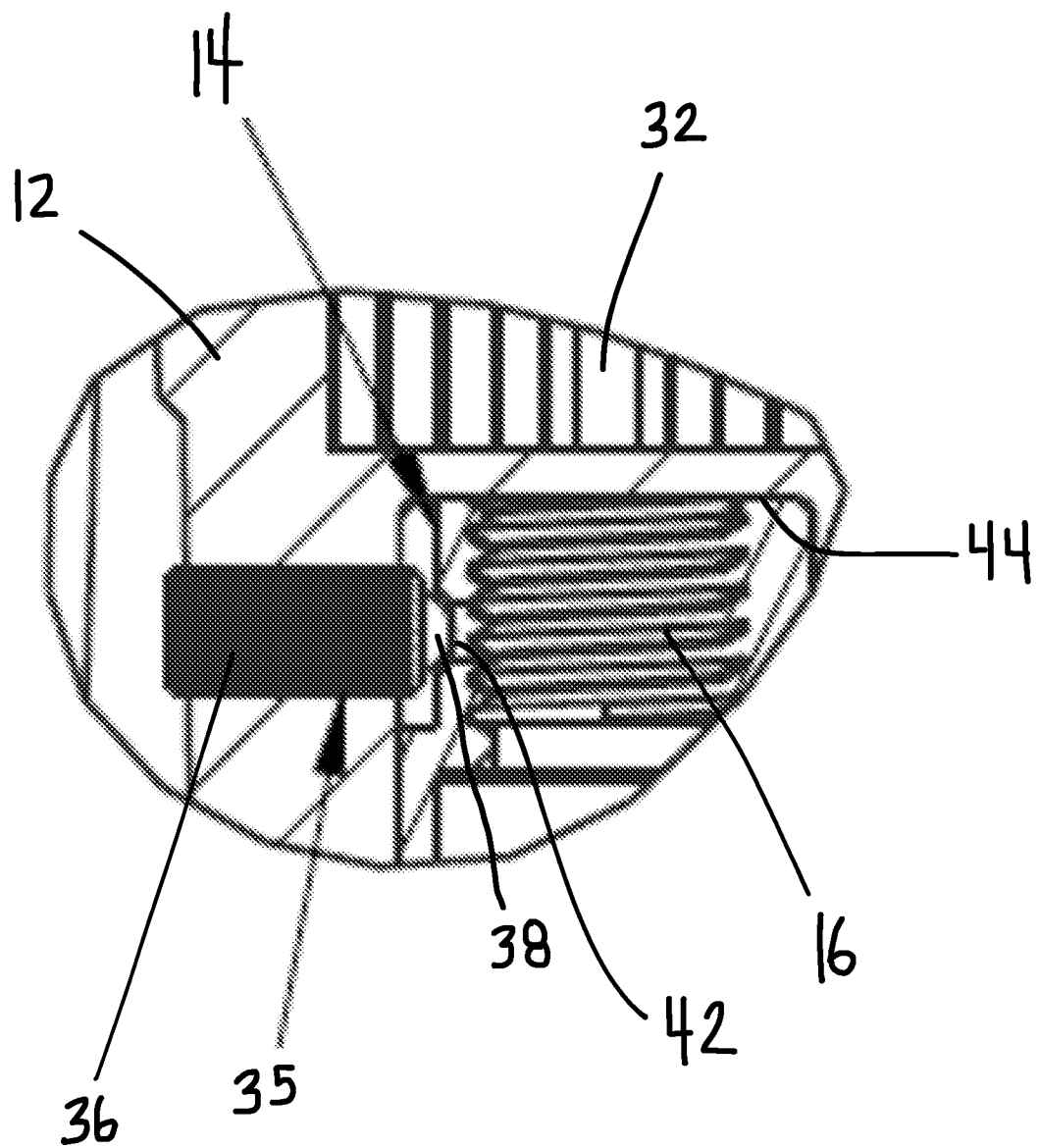
FIG. 6 is an enlarged, detail view of area A of FIG. 5.

The stem 30 of the coupler body 12 includes an axially extending, square or rectangular aperture 34 therein sized to snugly receive the adapter 14, as shown in FIGS. 5 and 6. While the aperture 34 is shown as being square or rectangular in shape, the aperture 34 may be of any appropriate shape to accept the adapter 14. Stem 30 is also provided with an engagement mechanism that is configured to provide for the releasable connection of the coupler body 12 to the adapter 14, as described hereinafter. For example, in an embodiment, the engagement mechanism may be a spring-loaded ball plunger 35 having a biasing spring 36 and a ball 38 which is biased to an extended position by the spring 36, such that the ball 38 protrudes at least partially into the rectangular aperture 34. Other engagement mechanisms for holding the coupler body 12 to the adapter 14, such as a friction fit or other mechanical fastening means may also be utilized without departing from the broader aspects of the invention.

As best shown in FIGS. 1, 5 and 6, the adapter 14 is generally square or rectangular in shape and is sized and dimensioned so as to be closely received within the square aperture 34 of the coupler body 12. The adapter 14 also includes a threaded, internal bore 40 that is configured to threadedly receive the threaded drive shaft 16 of the motor 18 for releasably connecting the adapter 14 to the drive shaft 16 of the motor 18. As shown in FIGS. 5 and 6, the bore 40 is dimensioned so that when the adapter 14 is threaded onto the drive shaft 16, the top surface of the adapter 14 is flush with the top surface of the drive shaft 16. The adapter 14 also includes a recess or detent 42 in an outer surface thereof for receiving and retaining the ball 38 of the spring-loaded ball plunger 35, as discussed hereinafter.

In use, the adapter 14 is threaded onto the drive shaft 16 of the motor 18 until the top surface of the drive shaft 16 is flush with the top surface of the adapter 14. Importantly, the internal threads of the bore 40 are oriented in a direction (handedness) such that rotation of the drive shaft 16 during motor operation functions to tighten the adapter 14 onto the drive shaft 16 (as opposed to loosening the adapter 14). The coupler body 12 is then connected to the adapter 14 by axially aligning the aperture 34 in the stem 30 of the coupler body 12 with the adapter 14 and sliding the coupler body 12 onto the adapter 14. Pushing downwardly on the coupler body 12 causes the spring-biased ball plunger 35 to retract against the bias of the spring 36 (as the side of the adapter 14 does not allow the ball 38 to be urged by the spring 36 into the aperture 34), thus allowing the adapter 14 to be fully received within the aperture 34 of the coupler body 12 until the top surface thereof contacts surface 44 within the coupler body 12, as shown in FIG. 6. In this position, the detent or recess 42 in the outer surface of the adapter 14 is aligned with the spring-biased ball plunger 35 (and thus the ball 38 is not held to its retracted position by the side of the adapter 14) such that the bias of the spring 36 urges the ball 38 towards the drive axis and into seating engagement with the detent 42. This engagement between the ball 38 and the detent 42 inhibits axial decoupling of the coupler body 12 from the adapter 14. As indicated hereinafter, however, an axial pulling force can be exerted on the coupler body 12 to disengage the ball 38 from the detent/recess 42 to allow for decoupling of the coupler body 12 from the adapter 14.

Once the drive coupling assembly 10 is connected to the shaft 16 of the motor, the processing container can be placed atop the pad so that the corresponding splined shaft of the blade of the processing container is received within the splined central opening 32 in the coupler body 12. Accordingly, rotation of the motor shaft 16 is transmitted to the blade of the processing container to process food items in a manner heretofore known in the art. As indicated above, through prolonged use, the splines of the splined opening 32 may wear out, inhibiting optimal performance. The configuration of the drive coupling assembly 10 of the present, however, allows for the easy and quick replacement of the coupler body 12. In particular, when replacement is necessary, the coupler body 12 can be decoupled from the adapter 14 and the base housing in the manner described above, namely, by grasping the coupler body 12 and pulling axially upward. This pulling force overcomes the holding force of the ball 38 in the recess 42, allowing the coupler body 12 to slide off the adapter 14. During this process, the adapter 14 remains in place on the drive shaft 16 of the motor 18 and need not be removed. A new coupler body 12 can then be connected to the adapter 14 in the manner described above, and use of the blender or food processor resumed.

While the embodiments disclosed above include a ball plunger 35 associated with the coupler body 12 and a corresponding recess or detent 14 associated with the adapter 14, it is contemplated that such components may be reversed, such that the adapter 14 is configured the spring biased ball plunger 35 (which biases the ball outwardly, away from the central axis of the motor), and the inner surface of the aperture 34 of the coupler body 12 includes a detent or recess for receiving the ball of the ball plunger 35 to connect the coupler body 12 to the adapter 14. Moreover, while the embodiments disclosed herein describe the adapter 14 as being removable connected (e.g., by threads) to the distal end of the drive shaft 16 of the motor, in an embodiment, adapter 14 may be integral with, or permanently affixed to, the drive shaft 16.

The drive coupling assembly 10 of the present invention therefore provides a simple means of quickly and easily replacing the drive coupling when the splines of the spline opening wear out through use. Importantly, the configuration of the drive coupling assembly, and the inclusion of the adapter in particular, allow the coupler body to be easily removed from the base so that a new coupler body can be connected to the drive shaft (via the adapter), without necessitating deconstruction or opening of the base housing.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A drive coupling assembly for a food processing device, comprising:
   an adapter having a connection mechanism for connection of the adapter to a drive shaft of a motor of a food processing device; and
   a coupler body having an aperture and an opening, the opening being configured to receive a shaft of a blade of a food processing container, and the aperture being configured to releasably receive the adapter;

wherein the coupler body and the adapter are configured such that an axial pulling force on the coupler body causes the coupler body to decouple from the adapter while the adapter remains connected to the motor shaft.

2. The drive coupling assembly of claim 1, further comprising:
a retaining mechanism configured to retain the coupler body on the adapter.

3. The drive coupling assembly of claim 2, wherein:
the retaining mechanism includes one of a spring-biased ball plunger or a recess associated with the adapter, and the other of a spring-biased ball plunger or a recess associated with the coupler body;
wherein a ball of the spring-biased ball plunger is biased into engagement with the recess when the adapter is received within the aperture of the coupler body to retain the coupler body on the adapter.

4. The drive coupling assembly of claim 3, wherein:
the spring-biased ball plunger forms part of the coupler body; and
the recess forms part of the adapter.

5. The drive coupling assembly of claim 2, wherein:
the connection mechanism is a plurality of threads configured to threadedly engage a plurality of threads on the drive shaft of the motor.

6. The drive coupling assembly of claim 5, wherein:
the plurality of threads of the adapter have an orientation such that rotation of the drive shaft of the motor of the food processing device functions to tighten, rather than loosen, the adapter on the drive shaft of the motor.

7. The drive coupling assembly of claim 1, wherein:
the coupler body includes a cap portion and a stem portion, the cap portion including the opening and the stem portion including the aperture.

8. The drive coupling assembly of claim 7, wherein:
the opening is a splined opening.

9. The drive coupling assembly of claim 1, wherein:
the adapter is configured such that when the drive shaft is received within the adapter, a top surface of the drive shaft is flush with a top surface of the adapter.

10. The drive coupling assembly of claim 1, wherein:
the aperture in the coupler body is square in shape.

11. A food processing device, comprising:
a motor;
a drive shaft driven by the motor;
an adapter connected to a distal end of the drive shaft;
a coupler body removably connected to the adapter, the coupler body having an upwardly-facing opening configured to receive a shaft of a blade of a food processing container of the food processing device; and
a retaining mechanism configured to retain the coupler body on the adapter;
wherein the coupler body and the adapter are configured such that an axial pulling force on the coupler body causes the coupler body to decouple from the adapter while the adapter remains connected to the motor shaft.

12. The food processing device of claim 11, wherein:
the adapter is receivable within an aperture in an underside of the coupler body;
wherein the retaining mechanism includes one of a spring-biased ball plunger or a recess associated with the adapter, and the other of a spring-biased ball plunger or a recess associated with the coupler body; and
wherein a ball of the spring-biased ball plunger is biased into engagement with the recess when the adapter is received within the aperture of the coupler body to retain the coupler body on the adapter.

13. The food processing device of claim 12, wherein:
the spring-biased ball plunger forms part of the coupler body; and
the recess forms part of the adapter.

14. The food processing device of claim 11, wherein:
the adapter is threadedly connected to the drive shaft; and
wherein threads of the adapter have an orientation such that rotation of the drive shaft of the motor functions to tighten, rather than loosen, the adapter on the drive shaft.

15. The food processing device of claim 12, wherein:
the coupler body includes a cap portion and a stem portion, the cap portion including the opening and the stem portion including the aperture.

16. The food processing device of claim 15, wherein:
the opening is a splined opening.

17. The food processing device of claim 11, wherein:
the adapter is configured such that when the adapter is connected to the drive shaft, a top surface of the drive shaft is flush with a top surface of the adapter.

18. The food processing device of claim 12, wherein:
the aperture in the coupler body is square in shape.

19. An adapter for a food processing device, comprising:
a rectangular body;
a threaded bore configured to threadedly receive a drive shaft of a motor of a food processing device for connection of the adapter to the drive shaft; and
one of a spring-biased ball plunger or a recess configured for engagement with the other of a spring-biased ball plunger or a recess associated with a coupler body of the food processing device, the coupler body being configured to transmit rotational movement of the drive shaft of the motor to a shaft of a blade of a food processing container of the food processing device;
wherein the spring-biased ball plunger and recess are configured to allow for decoupling of the coupler body from the adapter when an axial pulling force is exerted on the coupler body.

20. The adapter of claim 19, wherein:
threads of the threaded bore of the adapter have an orientation such that rotation of the drive shaft of the motor functions to tighten, rather than loosen, the adapter on the drive shaft.

* * * * *